United States Patent
Barfuss et al.

(10) Patent No.: US 7,010,175 B2
(45) Date of Patent: Mar. 7, 2006

(54) METHOD AND APPARATUS FOR MATCHING AT LEAST ONE VISUALIZED MEDICAL MEASURED RESULT WITH AT LEAST ONE FURTHER DATASET CONTAINING SPATIAL INFORMATION

(75) Inventors: Helmut Barfuss, Erlangen (DE); Gerold Herold, Erlangen (DE); Michael Scheuering, Erlangen (DE); Siegfried Wach, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 675 days.

(21) Appl. No.: 10/081,815

(22) Filed: Feb. 21, 2002

(65) Prior Publication Data

US 2002/0118867 A1  Aug. 29, 2002

(30) Foreign Application Priority Data

Feb. 23, 2001 (DE) ................................ 101 08 947

(51) Int. Cl.
*G06K 9/00* (2006.01)
*G06K 9/32* (2006.01)

(52) U.S. Cl. ...................... 382/294; 382/128; 382/132; 382/154

(58) Field of Classification Search ................ 382/128, 382/154, 294, 132
See application file for complete search history.

(56) References Cited

U.S. PATENT DOCUMENTS

| 5,226,095 | A | * | 7/1993 | Okumura et al. | 382/151 |
|---|---|---|---|---|---|
| 5,633,951 | A | * | 5/1997 | Moshfeghi | 382/154 |
| 5,946,425 | A | * | 8/1999 | Bove et al. | 382/294 |
| 6,351,573 | B1 | * | 2/2002 | Schneider | 382/294 |
| 6,466,813 | B1 | * | 10/2002 | Shukla et al. | 600/411 |
| 6,694,064 | B1 | * | 2/2004 | Benkelman | 382/284 |

FOREIGN PATENT DOCUMENTS

| DE | 196 39 615 | 10/1999 |
|---|---|---|
| DE | 198 46 687 | 4/2000 |

* cited by examiner

*Primary Examiner*—Joseph Mancuso
*Assistant Examiner*—Shefali Patel
(74) *Attorney, Agent, or Firm*—Schiff Hardin LLP

(57) ABSTRACT

In a method and apparatus for matching at least one visualized medical measured result of a test subject with at least one dataset of the test subject by means of landmarks, landmarks with respect to the displayed test subject are defined in every visualized measured result to be matched and every dataset to be matched. The geometrical arrangement of the landmarks in every measured result and each dataset is analyzed by a first algorithm, and subsequently an allocation of corresponding landmarks of the at least one visualized measured result and of the at least one dataset to form a landmark pair ensues with a second algorithm.

20 Claims, 5 Drawing Sheets

METHOD AND APPARATUS FOR MATCHING AT LEAST ONE VISUALIZED MEDICAL MEASURED RESULT WITH AT LEAST ONE FURTHER DATASET CONTAINING SPATIAL INFORMATION

BACKGROUND OF THE INVENTION

1. Field of the Invention

The present invention is directed to a method and to an apparatus for matching at least one visualized medical measured result with at least one further dataset containing spatial information, by means of landmarks.

2. Description of the Prior Art

It has long been standard in many medical fields to visually present measured results of a test subject such as, for example, a human body or a part thereof. For example, x-ray exposures are a very simple example of this. The advantage of visually presented measured results is that their content can be easily and quickly grasped, to allow a fast evaluation and a simple comparison of the measured results.

Measured results that are acquired with modern electronic measurement systems, and thus that are usually in digital form, are often edited by computer and visually presented—for example, on a monitor or with a printer. Examples of such electronic measurement systems that are currently in widespread use are computed tomography systems and magnetic resonance tomography systems.

A particular advantage of visualized measured results that are in digital form is that these are accessible for digital data processing, and thus can be edited further with suitable computational operations, for example with a computer.

The measured results can be nearly arbitrarily enlarged, reduced in size, turned, tilted, etc. by digital manipulations. Further, digital measured results can be analyzed and manipulated with suitable algorithms. A simple example of such manipulation is the coloring of certain characteristic regions of a visualized measured result.

Due to the above advantages, visualized measured results (for example, conventional x-ray images) that are usually not originally in digital form are digitized, for example with a scanner, in order to make them accessible for digital data processing.

Recently, a considerably need has arisen as a consequence thereof with respect to the further-processing of such visualized measured results.

Thus, for example, it is desirable to match a number of visualized measured results of a test subject that were registered with different measuring instruments, at different points in time with the same measuring instrument or from different observation positions, for the purpose of a comparative analysis. Matching with a reference measured result (for example, the visualized measured result of a healthy organ) can also be of interest.

A typical field of employment of this, in addition to diagnostics, is minimally invasive surgery.

In diagnostics, for example, it can be desirable to superimpose a current, visualized measured result of a test subject such as, for example, a body part of a patient, with another visualized measured result of the same test subject at some other point in time in order to be able to easily identify changes/trends.

A superimposition with a visualized reference measured result (that, for example, shows a healthy organ) or some other dataset containing a spatial information also can be of interest.

In particular, the superimposition of visualized measured results makes it possible to combine the intensities of different measuring devices/measuring methods. For example, a tumor identified with a measuring method of x-ray diagnostics could be combined into a visualized measured result produced by a measuring method of magnetic resonance tomography.

Another advantage of matching visualized measured results is that a uniform measured result for the entire test subject can be acquired from a number of visualized measured results of a part of the test subject under consideration that are registered in overlapping fashion, by suitable superimposition of the visualized measured results.

It is often necessary in minimally invasive surgery to remotely control the movement of probes and to thereby solve complex navigation tasks. It is of particular advantage when a visualized measured result of the momentary position of a probe, be determined with a first measuring instrument (for example, a digital x-ray apparatus), can have a visualized measured result of the same test subject registered with a different medical apparatus (for example, a magnetic resonance tomography apparatus) or registered from a different observation angle superimposed on it.

Such a matching in the form of a superimposition is desirable not only in two-dimensional space but also in n-dimensional space.

Problems in the matching of different visualized measured results particularly occur due to different alignments and distortions, but also arise due to different scalings of the visualized measured results to be considered.

For solving this problem, it is known to implement a matching of a number of visualized medical measured results of a test subject by means of landmarks.

The basic principle of this known method is explained below on the basis of FIGS. 5 and 6 with reference to the example of two visualized medical measured results to be matched:

In a first step S10, a first landmark E1 is defined in a first visualized measured result E.

In a second step S20, a switch is made to another visualized measured result E' of the same test subject MO.

In a third step S30, a landmark E1' is defined at a corresponding point of the visualized measured result E'. For orientation, one can make use of the test subject MO shown in the visualized measured results E, E'.

The points E1 and E1' thus form a point pair that is defined from the outset.

Although the landmarks can be fundamentally defined at arbitrary points in the visualized measured result, it is advantageous to select characteristic points of the test subject MO shown in the visualized measured results E, E' as landmarks, so that points can be selected for a point pair that always correspond to one another in the various visualized measured results.

Subsequently, a check is made in step S40 to determine whether an adequate number of point pairs have already been defined. For a two-dimensional matching, at least two are usually required and at least three point pairs are usually required for a three-dimensional matching.

If the check in step S40 shows that an adequate number of point pairs have not yet been defined, then a switch is made back to the first visualized measured result E in step S50, and the method is continued in step S10 with the definition of a further landmark E2 in the first visualized measured result E.

If the check in step S40 shows that an adequate number of point pairs have been defined, then the method continues with step S60 wherein the two visualized measured results are matched by placing the landmarks E1, E1', E2, E2', etc., forming a point pair on top of one another.

It is disadvantageous in the aforementioned method that the landmarks forming a point pair always must be placed by pairs in the visualized measured results, since the reference between the landmarks would otherwise be lost. Thus, one must constantly change back and forth between the visualized measured results being observed. Accordingly, the known method is very complicated, and thus it is often not possible for a physician in the operating room to implement a matching arrangement as required, for example, for navigation tasks), of a newly acquired, visualized medical measured result on site.

German Patent 196 39 615 discloses a reflector referencing system for surgical and medical instruments as well as a marker system for body portions to be treated neural-surgically. This known apparatus has at least two cameras and a computer unit connected to the cameras, and also has a radiation source for infrared radiation and a reflector group having at least two reflectors for this infrared radiation. The reflectors are attached to the instruments or treatment apparatus in an arrangement that is characteristic of only this reflector group. The known referencing system thus functions with passive reflectors secured to the patient or to the treatment table.

An apparatus for the implementation of medical interventions and a method for generating an image are disclosed in German OS 198 46 687. According to this known apparatus, first image data acquired pre-operatively are updated with second image data acquired intra-operatively, namely according to the changes between two second image data registered at different points in time. A calibration device is provided for this purpose, which is attached rigidly to the body of a patient and has at least one landmark which represents a fixed, common reference point for the first and second image data with reference to the body. Such a device allows, for example, matching image data obtained with ultrasound immediately before the beginning of the operation with image data obtained pre-operatively by means of computed tomography or magnetic resonance tomography, this being carried out by a so-called "co-registration". Preferably, a stereotactic identifier is employed as the landmark. Further, German OS 198 46 687 discloses a method that includes the steps of storing first image data of the body acquired, for example, by means of computer tomography or magnetic resonance tomography, registering second image data of the body, for example with ultrasound, at a first point in time and at a second point in time following the first point in time, comparing the second image data registered at the first and at the second points in time to one another, updating the first image data according to the change deriving from the comparison, and displaying the updated, first image data. The first point in time and the position of the body in the registration of the second image data are selected such that the second image data registered at the first point in time correspond to the stored, first image data. In other words, a calibration has to be undertaken by matching the first and the second image data to one another to be sure they reproduce one and the same condition of the body.

SUMMARY OF THE INVENTION

An object of the present invention is to provide a method and an apparatus for matching at least one optically displayed measured result acquired with a medical apparatus from a test subject with at least one dataset containing information from the test subject by means of landmarks, which enable an especially simple and flexible definition of the landmarks.

This object is achieved according to the invention in a method for matching at least one optically presented measured result acquired with a medical apparatus from a test subject with at least one dataset containing information from the test subject by means of landmarks for the purpose of a comparative analysis or for the combination of intensities of different measuring devices or measuring methods, wherein landmarks with respect to the displayed test subject are defined in every optically presented measured result to be matched and every dataset to be matched, and the geometrical arrangement of landmarks in each optically presented measured result and each dataset is analyzed by a first algorithm and, subsequently, an allocation of corresponding landmarks of the at least one optically presented measured result and of the at least one dataset to form a landmark pair ensues with a second algorithm.

Since the allocation of the landmarks defined in the at least one optically presented measured result acquired with a medical apparatus and defined in the at least one dataset to form landmark pairs according to the present invention is no longer manually prescribed by an operator when the landmarks are defined but is automatically determined by analysis of the geometrical arrangement of the landmarks in the at least optically presented measured result and the at least one dataset, it is no longer necessary in the definition of the landmarks to adhere to a predetermined sequence and/or constantly change back and forth between the at least one optically presented measured result and the at least one dataset. Since the landmarks in the at least one optically presented measured result and the at least one dataset can be defined completely independently of one another, it is also possible with the inventive method to prepare optically presented measured results, or datasets provided with landmarks, so that (for example, in the operating room) only a current, optically presented measured result or a current dataset need be newly provided with landmarks later.

In a preferred embodiment, the absolute spacings of the landmarks in the individual, optically presented measured results and the individual datasets are calculated using the first algorithm, and the allocation of corresponding landmarks of the at least one optically presented measured result and the at least one dataset is implemented using the second algorithm, dependent on the absolute spacings of the landmarks calculated with the first algorithm.

As a result, an allocation of corresponding landmarks of at least one optically presented measured result acquired with a medical apparatus and at least one dataset can be especially easily produced given the same scaling and asymmetrically arranged landmarks. The scaling is becoming increasingly unproblematical given modern measuring instruments since the optically presented measured results are often output with the real size of the test subject and uniformly dimensioned in millimeters. The same is usually true of datasets containing spatial information.

In an alternative embodiment, the relative spacings of the landmarks in the individual, optically presented measured results and the individual datasets are calculated upon employment of the first algorithm, and the allocation of corresponding landmarks of the at least one optically presented measured result and the at least one dataset is implemented using the second algorithm dependent on the relative spacings of the landmarks calculated with the first algorithm.

Due to the use of relative spacings of the landmarks (for example, the smallest spacing between two landmarks, or the average spacing between the landmarks can be utilized as reference quantity), an allocation of corresponding landmarks is possible in an especially easy way given optically presented measured results acquired with a medical apparatus and datasets containing spatial information which exhibit different scaling (as is often the case when x-ray images are scanned). When an allocation is to ensue only with the assistance of the relative spacings of the landmarks, then the landmarks must be asymmetrically arranged.

It is especially advantageous for the second algorithm to permutate the allocation of the landmarks until an adequately high coincidence has been found. Preferably, the method can be aborted as soon as 90% of the landmarks can be reliably allocated.

It is thus assured that the processing time for the matching of the optically presented measured results does not become unnecessarily long. Inaccurate matching due to incorrectly defined landmarks also is avoided.

The second algorithm is preferably suited for recognizing and rejecting false landmarks.

As a result, it is possible to blank out landmarks that have been incorrectly defined or for which no corresponding landmark is found in an optically presented measured result to be matched, or in a dataset to be matched, due to for example, a different number of landmarks having been defined in the optically presented measured results and/or datasets to be matched. As a result, the inventive method becomes especially error-tolerant.

The definition of at least one landmark preferably ensues automatically on the basis of the data underlying the respective, optically presented measured results and underlying the respective datasets. As a result, it is possible to relieve a person controlling/monitoring the implementation of the method from menial and repetitive activities. Further, the matching can ensue especially rapidly and simply since the intervention of an operator is no longer required in the optimum case. It is especially advantageous to attach the markers to the test subject, and for the definition of at least one landmark to ensue automatically with pattern recognition algorithms, since an especially dependable, automatic definition of landmarks is thus possible.

According to a preferred embodiment, the definition of landmarks in the optically presented measured results given a two-dimensional matching of at least one optically presented measured result required with a medical apparatus from a test subject with at least one dataset containing an information from the measured object sequences according to the following strategy:

a) Definition of at least three landmarks in arbitrary sequence in the at least one optically presented measured result with reference to the illustrated test subject, whereby at least one landmark is differently spaced from the remaining landmarks;

b) Definition of at least three landmarks in an arbitrary sequence in each dataset with reference to the illustrated test subject, whereby at least three arbitrary landmarks of each and every dataset corresponds to two arbitrary landmarks and the at least one landmark differently spaced from the remaining landmarks of the at least one optically presented measured result.

Since, according to this preferred embodiment, the landmarks are defined in the at least one optically presented measured result and the at least one dataset so that at least one landmark is differently spaced from the remaining landmarks, it is assured that the arrangement of the landmarks is not symmetrical overall. As a result, a reliable allocation of corresponding landmarks of at least one optically presented measured result and at least one dataset to form landmark pairs is always possible with simple means given an adequate number of landmarks.

In the inventive method, the analysis of the geometrical arrangement of landmarks defined in the at least one optically presented measured result ensues in the inventive method with the first algorithm before the definition of landmarks in the at least one dataset.

As a result, it is possible to largely prepare specific optically presented measured results acquired with a medical apparatus, or corresponding datasets, for a matching for an allocation of mutually corresponding landmarks of differently optically presented measured results or datasets with the second algorithm.

Alternatively, the analysis of the spatial (geometrical) arrangement of landmarks defined in the at least one optically presented measured result and the at least one dataset can ensue with the first algorithm in common for all landmarks, ensuing only after definition of all landmarks in the at least one optically presented measured result and the at least one dataset.

The present invention also includes an apparatus for matching at least one optically presented measured result acquired with a medical apparatus from a test subject with at least one dataset containing an information from the test subject by means of landmarks for a comparative analysis or for combining the outputs of different measuring instruments. The apparatus includes a unit for defining landmarks with respect to the illustrated test subject in the at least one optically presented measured result and the at least one dataset, an analysis unit for analyzing the geometrical arrangement of landmarks in the at least one optically presented measured result and the at least one dataset using a first algorithm, and a unit for allocating mutually corresponding landmarks of the at least one optically presented measured result and the at least one dataset to form a landmark pair after the analysis of the landmarks using a second algorithm.

It is thus possible to realize the inventive method and achieve the aforementioned object.

In a preferred exemplary embodiment, the apparatus additionally includes a definition unit for implementing the definition of at least one landmark on the basis of the data underlying the at least one optically presented measured result or the at least one dataset.

In a preferred embodiment, markers are applied to the test subject, whereby the definition unit automatically implements the definition of at least one landmark on the basis of pattern recognition algorithms.

It is especially advantageous when the definition for defining landmarks, the analysis unit for analyzing the spatial arrangement of landmarks, and the unit for implementing an allocation of mutually corresponding landmarks are formed by a computer, a picture screen and an input unit, since the claimed apparatus can be realized especially inexpensively and simply by employing such standard components.

Preferably, the input unit is a computer mouse since the landmarks can thus be graphically defined as an optically presented measured result or dataset, and a complicated and error-affected input of coordinates or the like can be omitted. Alternatively, however, a pointer connected with a navigation system also can be employed.

It is advantageous when the apparatus further includes a memory for storing the at least one optically presented measured result and the at least one dataset, and the memory means is suitable for also storing landmarks defined in the at least one optically presented measured result and the at least one dataset, since the visualized (optically presented) measured results thus can be edited for a later matching (for example, during an operating procedure).

DESCRIPTION OF THE PREFERRED EMBODIMENTS

Figure 1:
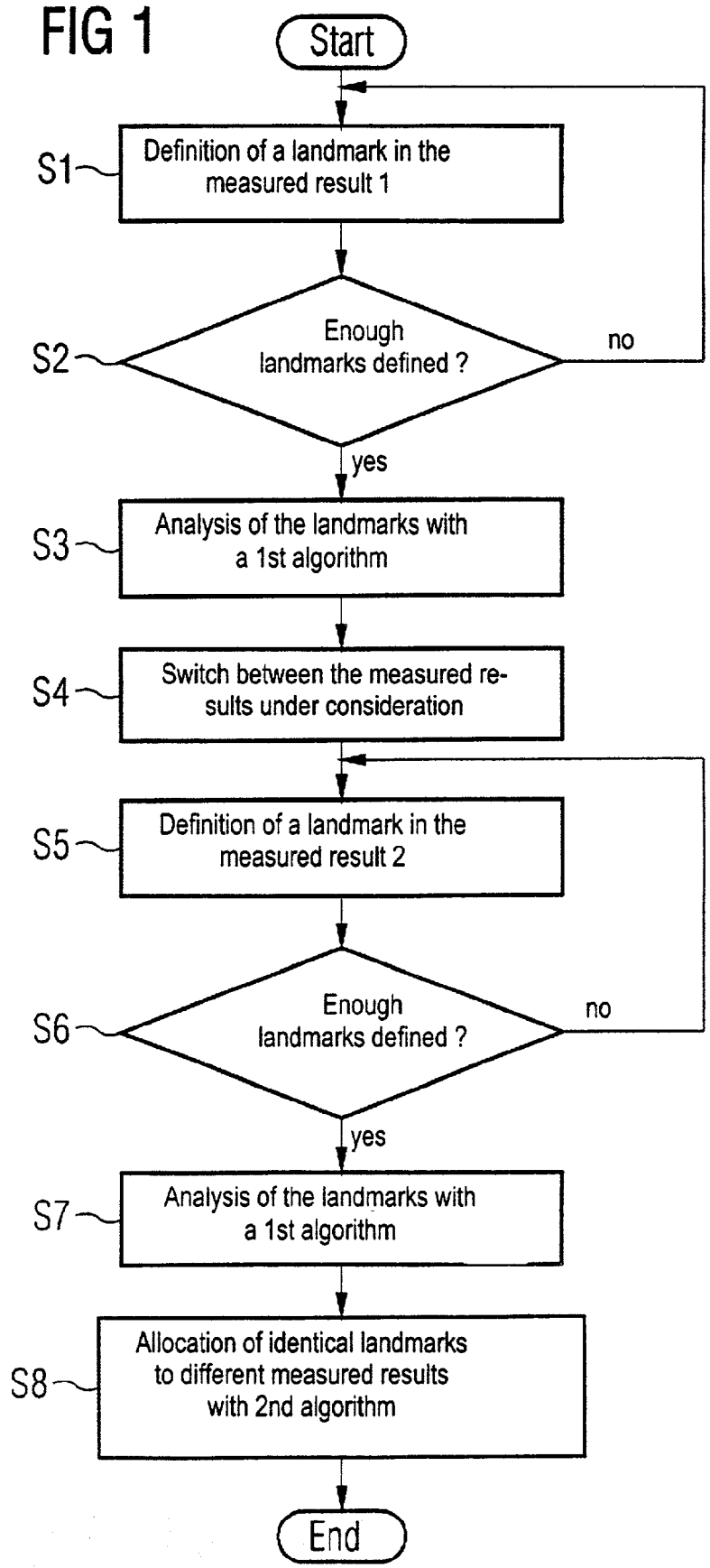
FIG. 1 is a flow chart of the inventive method.
Figure 2:
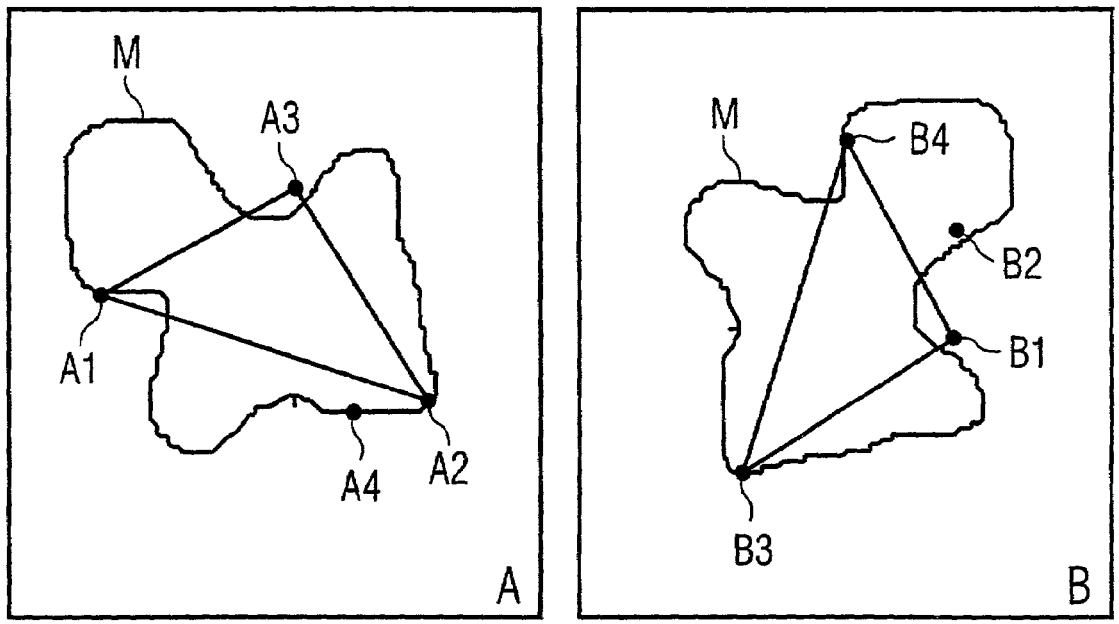
FIG. 2 illustrates a first exemplary embodiment of the present invention.

A first preferred exemplary embodiment of the inventive method is described on the basis of FIGS. 1 and 2.

Two visualized measured results are matched to one another as an example in the exemplary embodiments described below, however, it should be emphasized that, alternatively, two or more datasets of a test subject containing spatial information (for example, two navigation systems of minimally invasive medical devices) or a visualized measured result of a test subject (for example, a magnetic resonance image) and a dataset of the same test subject containing a spatial information also can be matched with one another according to the present invention. As a result, for example, it is possible to mix positions of sensors that are defined in the coordinate system of a navigation system into a visualized measured result of a nuclear magnetic resonance tomography apparatus. The most important fact is that spatial data appertaining to the same test subject are matched.

As shown in FIG. 1, a first landmark A1 is defined in a first visualized medical measured result A ("measured result 1") in a first step S1. It is advantageous when the landmarks are defined at characteristic locations of the test subject M imaged in the measured result A.

Such a visualized medical measured result A that shows a test subject M, for example, a human organ, is shown in FIG. 2.

Subsequently, a check is made in Step S2 to determine whether an adequate number of landmarks has already been selected. For an automatic matching of a plurality of two-dimensional, visualized medical measured results, at least two landmarks are usually required;for matching a number of three-dimensional, visualized medical measured results, at least three landmarks are required.

If the result of Step S2 is negative, then Step S1 is repeated until an adequate number of landmarks A1–A4 has been defined.

If, in contrast, it is found in Step S2 that an adequate number of landmarks A1–A4 has already defined in the first visualized measured result A, then the spatial allocation of the landmarks A1–A4 of the first visualized measure result is analyzed with a first algorithm in Step S3. In this example, this analysis is composed of a calculation of the absolute spacings of the landmarks A1–A4 from one another.

In Step S4, a switch is made to a second visualized medical measured result B that shows the same test subject M.

In this second visualized medical measured result B, ("measuring result 2"), a first landmark B1 is defined in Step S5. It is also advantageous when the landmarks are defined at characteristic locations of the test subject M imaged in the measured result B.

Subsequently, a check is made in Step S6 to determine whether an adequate number of landmarks has already been selected in the second visualized medical measured result B.

If the result of Step S6 is negative, then Step S5 is repeated until an adequate number of landmarks B1–B4 has been defined in the second visualized medical measured result B.

If, in contrast, it is found in Step S6 that an adequate number of landmarks B1–B4 has been defined in the second visualized medical measured result B, then the spatial arrangement of the landmarks B1–B4 of the second visualized measured result B is analyzed like the landmarks A1–A4 of the first measured result A with the same algorithm in Step S7.

In the following step S8, an allocation of identical landmarks of various measured results is implemented with a second algorithm on the basis of the analysis results of the first algorithm for the first and second visualized measured result A, B.

In the present example, the second algorithm compares the absolute spacings of the landmarks in the first or second visualized measured result calculated by the first algorithm to one another and thus allocates a landmark of the second visualized measured result B to a respective landmark of the first visualized measured result A. This paired allocation of the landmarks is repeated until an adequately high coincidence is achieved.

In the example of FIG. 2, the paired allocation of the landmarks A1–A4 and B1–B4 is repeated until the landmark pairs A1, B4; A3, B1 and A2, B3 have been found and the landmarks A4 and B2 have been blanked out as being false.

On the basis of the landmark pairs that have now been found, it is now possible to computationally process the visualized medical measured results A, B present in digital form—i.e., to reduce them, to enlarge them, to rotate them, to tilt them, to distort them, etc., as needed—until the point pairs formed from landmarks of the first and of the second visualized measured result A, B come to lie on top of one another.

The visualized medical measured results matched in this way can, for example, be visually placed on top of one another or be gated into a control system for a probe.

Since the allocation of the landmarks defined in the visualized measured results to form landmark pairs according to the present invention does not ensue manually by an operator defining the landmarks, but instead the landmarks are automatically defined by analysis of the spatial allocation of the landmarks in the visualized measured results, it is not necessary in the definition of the landmarks to adhere to a prescribed sequence and/or to constantly switch back and forth between the visualized measured results. Since the landmarks in the visualized measured results thus can be defined completely independently of one another, it is also possible with the inventive method to edit visualized measured results provided with landmarks such that (for example, in the operating room) only an updated, visualized measured result need be provided with landmarks later, and a matching of the visualized measured results thus can ensue especially quickly and simply.

It must be emphasized that the analysis of the spatial allocation of the landmarks A1–A4 of the first visualized measured result A implemented in Step S3 with the first algorithm need not necessarily ensue before the definition of the landmarks B1–B4 in the second visualized measured result B. Alternatively, for example, it is possible to implement the analysis of the spatial allocation of the landmarks A1–A4 of the first visualized measured result A with the first algorithm in a common step together with the analysis of the spatial arrangement of the landmarks B1–B4 of the second visualized measured results B after definition of the landmarks B1–B4 in the second visualized measured result.

The first algorithm described in the first exemplary embodiment offers the advantage that an allocation of mutually corresponding landmarks can be produced especially simply with it given identically scaled medical measured results and asymmetrically arranged landmarks on the basis of the absolute spacings of the landmarks from one another. The scaling of visualized medical measured results is increasingly unproblematical given modern measuring instruments, since the visualized measured results are often output in the real size of the test subject and uniformly dimensioned in millimeters.

For a dependable matching of two-dimensional (three-dimensional), visualized measured results, the described, second algorithm requires at least three (4) landmark pairs. The number of required landmark pairs, however, can be reduced when, for example, angles between the landmarks are additionally analyzed with the first algorithm and these are also evaluated by the second algorithm.

Figure 3:
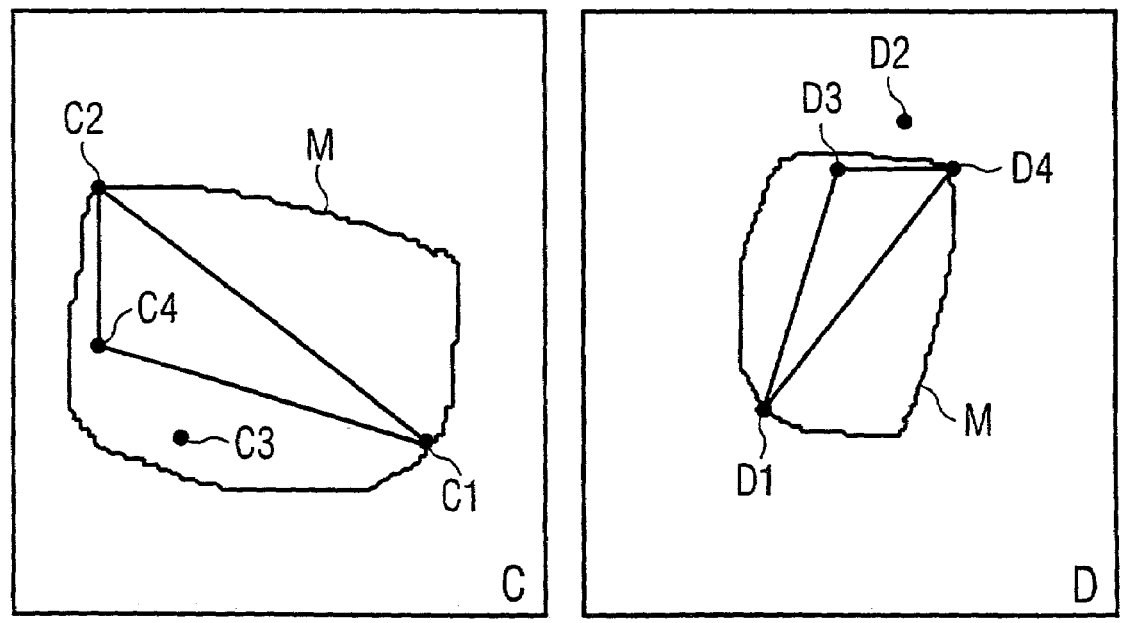
FIG. 3 illustrates a second exemplary embodiment of the present invention.

FIG. 3 another shows another exemplary embodiment of the present invention.

This second exemplary embodiment differs from the above-described, first exemplary embodiment in that, first, the definition of respective landmarks C2 and D4 in the visualized measured results C and D ensues automatically on the basis of the datasets underlying the respective, visualized measured results C, D.

Such an automatic definition of landmarks is possible when characteristics in the datasets can be computationally found.

In the second exemplary embodiment, the existence of a change in contrast and of a small radius in the visualized measured result have been selected as criteria for an automatic definition of landmarks.

Alternatively, however, it would be possible to arrange markers on the test subject (for example, a patient) that can be automatically recognized with pattern recognition algorithms.

Due to the automatic definition of landmarks, it is possible to relieve a person controlling or monitoring the implementation of the method from menial and repetitive activities. Further, the matching of a number of visualized medical measured results can ensue especially quickly and simply in this way, since the intervention of an operator is no longer required in the optimum case.

Additionally, the second exemplary embodiment differs from the first exemplary embodiment in that the steps S3 and S7, i.e. the analysis of the landmarks C1–C4, D1–D4, are combined with the first algorithm in the Step S7. The analysis of the spatial allocation of the landmarks C1–C4 and D1–D4 defined in the visualized measured results C, D ensues with the first algorithm, only after all landmarks have been defined in the visualized measured results C and D.

In contrast to the first exemplary embodiment, the first algorithm in the second exemplary embodiment analyzes the arrangement of the landmarks C1–C4, D1–D4 defined in the first or second visualized measured result C, D on the relative spacings of the landmarks from one another. To that end, the spacing of two arbitrary landmarks of a visualized measured result C, D is extracted. Subsequently, the spacings of the other landmarks relative to one another are placed in relationship to the extracted spacing.

In order to avoid errors due to incorrectly placed landmarks, it is thereby recommendable to additionally identify the spacing between at least two further landmarks, and to place the remaining spacings in relationship to one another for this purpose. However, it is especially error-tolerant when the relationship is formed by the average spacing of the landmarks.

Due to the employment of relative spacings of the landmarks from one another, an allocation of mutually corresponding landmarks is possible in an especially simple way in the case of visualized medical measured results that comprise a different scaling (such is frequently the case, for example, in x-ray images that have been scanned).

The paired allocation of the landmarks with the second algorithm in Step S2 likewise ensues in the second exemplary embodiment using the calculated, relative spacings. The allocation of the landmarks is permutated until 90% of the landmarks can be dependably allocated. Incorrect landmarks are recognized by the second algorithm and discarded.

As a result, it is assured, first, that the processing time for the matching of the visualized measured result does not become unnecessarily long and second, that a false matching due to incorrectly defined landmarks is avoided. Moreover, the inventive method becomes especially error-tolerant.

Figure 4:
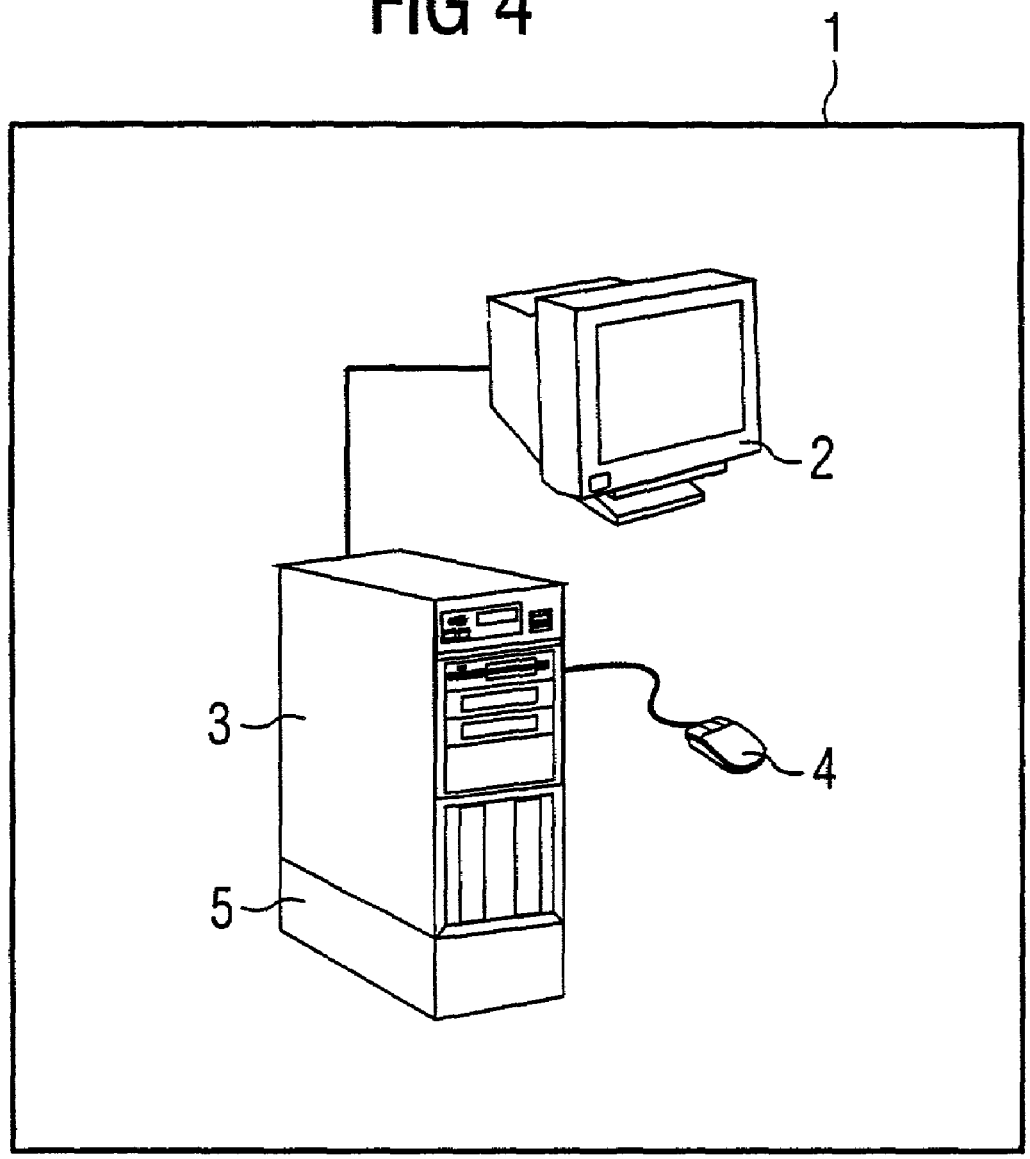
FIG. 4 is a schematic illustration of an exemplary embodiment of the inventive apparatus.
Figure 5:
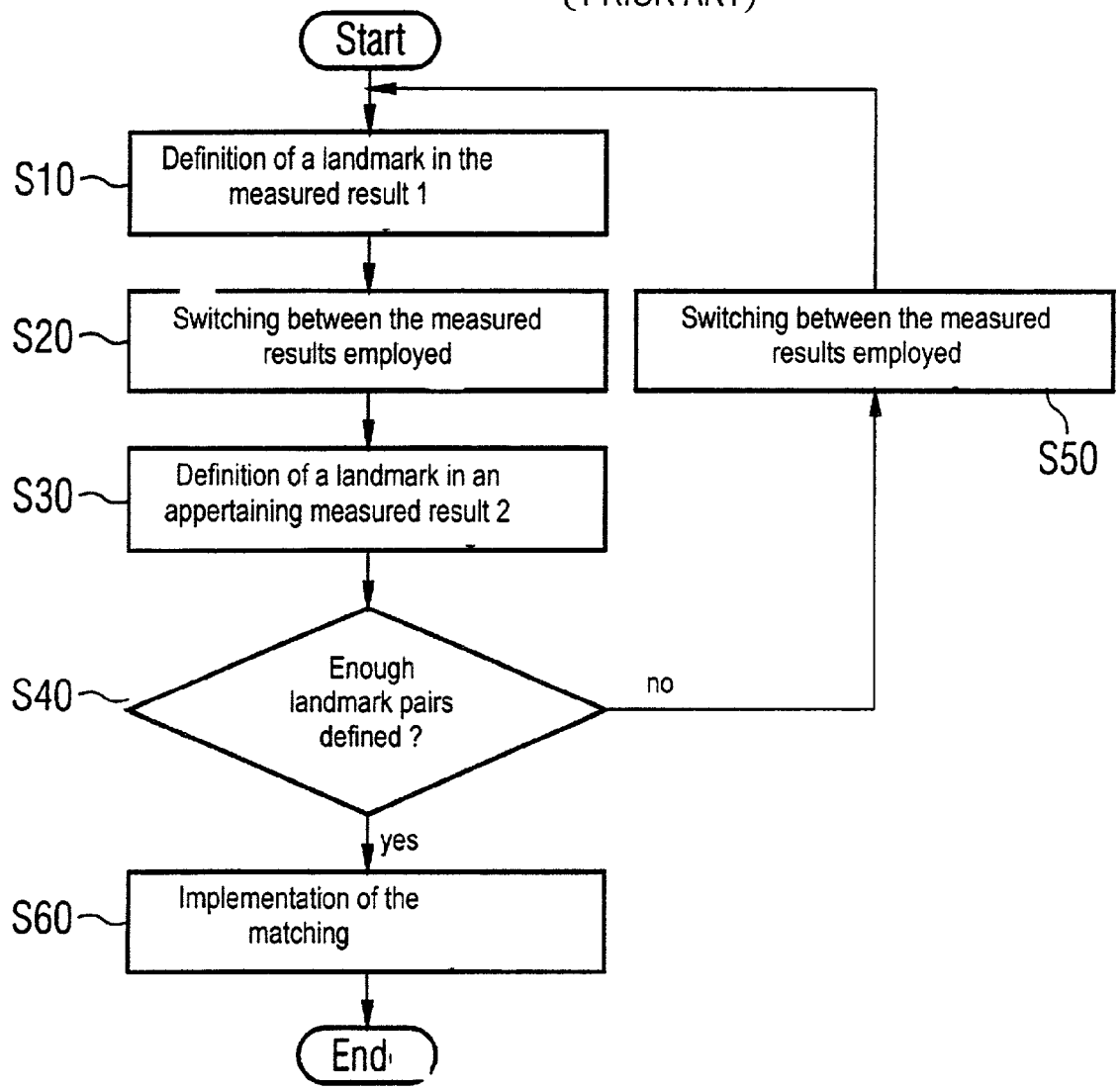
FIG. 5, as noted above, is a flow chart of a known method.
Figure 6:
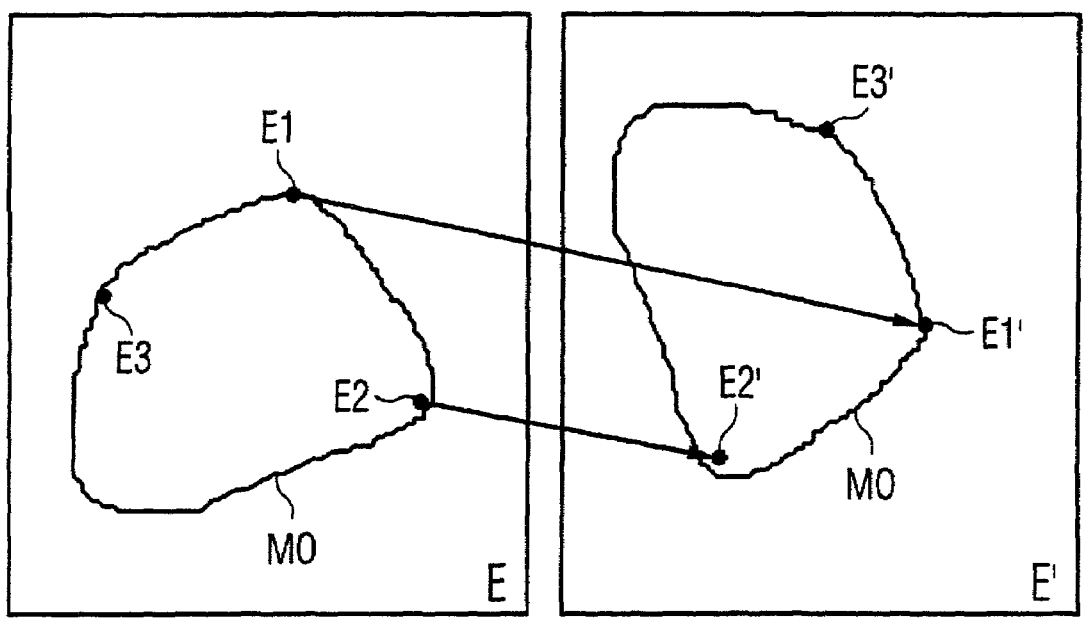
FIG. 6, as noted above, is an example for explaining the known method of FIG. 5.

FIG. 4 shows a preferred exemplary embodiment of an inventive apparatus that is suitable for the implementation of the above-described method.

The inventive apparatus 1 comprises a unit for defining landmarks with reference to a presented test subject in visualized measured results, a unit for analyzing the spatial arrangement of landmarks in the measured results under consideration by means of the first algorithm, as well as a unit for the implementation of an allocation of mutually corresponding landmarks of different, visualized measured results to form a landmark pair according to the analysis of the landmarks with the second algorithm.

In the illustrated, preferred exemplary embodiment, the unit for defining landmarks in visualized measured results with reference to an illustrated test subject is formed by a computer 3, a picture screen 2 connected thereto and a computer mouse 4 connected to the computer. Alternatively to the computer mouse, however, any other input device (for example, a pointer of a navigation system) can be employed.

The visualized medical test result to be processed and thus the test subject shown therein, are initially graphically displayed on the picture screen 2 after the data underlying the visualized medical test result have been loaded into the computer 3.

Using the computer mouse 4 connected to the compute 3, it is then possible for a user of the inventive device 1 to select points as landmarks in the illustrated, visualized measured result in relationship to the illustrated test subject. The coordinates of the selected points are stored in a memory 5 (integrated in the computer 3 in the illustrated example) by the computer 3 with reference to the processed measured result, so that landmarks are defined in the processed, visualized measured result.

The unit for analyzing the spatial arrangement of landmarks in the measured results under consideration with a suitable first algorithm, just like the unit for the implementation of an allocation of mutually corresponding landmarks of different, visualized measured results to form a landmark pair, is formed by the computer 3 in the preferred exemplary embodiment, using a second algorithm.

A computer program is stored for this purpose in the computer 3. For entering the first and second algorithms, the computer 3 can be connected to further input unit such as, for example, a keyboard (not shown in FIG. 4).

The computer 3 is also suited for processing the visualized medical measured results on the basis of the underlying data such that at least one landmark and at least one of the visualized medical measured results under consideration can be automatically defined by the computer 3.

In the illustrated, preferred exemplary embodiment, the memory 5 integrated in the computer 3 also is suitable for storing the analysis results of the spatial arrangement of the landmarks of a visualized medical measured result calculated by the computer 3 with the first algorithm for a later further employment with reference to the visualized measured result under consideration.

Although modifications and changes may be suggested by those skilled in the art, it is in the intention of the inventors to embody within the patent warranted hereon all changes and modifications as reasonably and properly come within the scope of their contribution to the art.

We claim as our invention:

1. A method for matching two or more visualized measured results obtained with a medical device from an examination subject comprising:
    arranging two or more landmarks in a first visualized measured result in a geometrical arrangement;
    determining if a sufficient number of landmarks has been arranged in said first visualized measured result, and, if yes, analyzing a spatial allocation of said arranged landmarks in said first visualized measured result using a first algorithm;
    arranging two or more landmarks in a second visualized measured result in a geometrical arrangement;
    determining if a sufficient number of landmarks has been arranged in said second visualized measured result, and, if yes, analyzing a spatial arrangement of said arranged landmarks in said second visualized measured result using said first algorithm, and
    allocating respectively matching landmarks from said first and second visualized measured result to form landmark pairs using a second algorithm based on the analyzing results from the first algorithm.

2. The method as claimed in claim 1 further comprising using said first algorithm to calculate absolute spacings among said landmarks in the respective visualized measured results, and using the second algorithm to allocate corresponding landmarks in at least one visualized measured result using the absolute spacings calculated with said first algorithm.

3. The method as claimed in claim 1 further comprising using said first algorithm to calculate relative spacings among said landmarks in the respective visualized measured results, and using the second algorithm to allocate corresponding landmarks in at least one visualized measured result using the relative spacings calculated with said first algorithm.

4. The method as claimed in claim 1 further comprising, in said second algorithm, permutating the allocation of the landmarks until a predetermined high coincidence is reached.

5. The method as claimed in claim 4 further comprising, in said second algorithm, permutating the allocation of said landmarks until 90% of said landmarks are allocated.

6. The method as claimed in claim 1 further comprising, in said second algorithm, recognizing and rejecting false landmarks.

7. The method as claimed in claim 1 further comprising automatically defining at least one of said landmarks using data underlying the respective visualized measured results.

8. The method as claimed in claim 7 further comprising physically attaching markers to said examination subject, and automatically defining said at least one landmark automatically with a pattern recognition algorithm.

9. The method as claimed in claim 1 further comprising:
    conducting a two-dimensional matching of said at least one visualized measured result and at least one dataset, and
    defining said landmarks according to the steps of:
        defining at least three landmarks in an arbitrary sequence in said at least one visualized measured result with reference to a displayed image of said examination subject, with at least one of said landmarks being differently spaced from a remainder of said landmarks to prohibit an over all symmetrical arrangement of the at least three landmarks; and
        defining said at least three landmarks in an arbitrary sequence in each of said datasets with reference to said displayed image of said examination subject, with at least three of said landmarks in each dataset corresponding to two arbitrary landmarks and said landmark that is differently spaced from the remainder of said landmarks.

10. The method as claimed in claim 1 further comprising defining said geometrical arrangement of said landmarks using said first algorithm before defining said landmarks in at least one dataset.

11. The method as claimed in claim 1 further wherein the step of analyzing said landmarks with said first algorithm comprises analyzing all of said landmarks in common with said first algorithm only after all of said landmarks are defined in said at least one visualized measured result.

12. An apparatus for matching two or more visualized measured results obtained with a medical device from an examination subject containing information from said examination subject, comprising:
    a landmark definition unit for defining and arranging two or more landmarks in a first visualized measured result in a geometrical arrangement and two or more landmarks in a second visualized measured result in a geometrical arrangement;
    an analysis unit for determining if a sufficient number of landmarks has been arranged in said first and second visualized measured result, and if yes for either, analyzing an appertaining spatial allocation of said arranged landmarks in said first visualized measured result and said second visualized measured result, respectively, using a first algorithm; and
    an allocation unit for matching landmarks from said first and second visualized measured result to form landmark pairs using a second algorithm based on the analyzing results from the first algorithm.

13. The apparatus as claimed in claim 12 wherein said landmark definition unit defines at least one of said landmarks using data underlying said at least one visualized measured result.

14. The apparatus as claimed in claim 13, further comprising markers adapted for direct application to said examination subject and wherein said definition unit automatically identifies at least one of said markers, as at least one of said landmarks, using a pattern recognition algorithm.

15. The apparatus as claimed in claim 12 wherein said definition unit, said analysis unit and said allocation unit in combination form a computer with a picture screen and an input unit.

16. The apparatus as claimed in claim 15 wherein said input unit is a computer mouse.

17. The apparatus as claimed in claim 12 further comprising a memory, accessible at least by said definition unit, in which said at least one visualized measured result.

18. The apparatus as claimed in claim 17 wherein said memory also stores landmarks defined in said at least one visualized measured result.

19. The apparatus as claimed in claim 17 wherein said memory also stores landmarks defined in at least one dataset.

20. The apparatus as claimed in claim 17 wherein said memory also stores landmarks defined in said at least one visualized measured result and at least one dataset.

* * * * *